Jan. 30, 1923.
J. D. REISZ.
ATTACHMENT FOR TRACTOR PLOWS.
FILED JULY 21, 1921.
1,443,647
2 SHEETS-SHEET 1
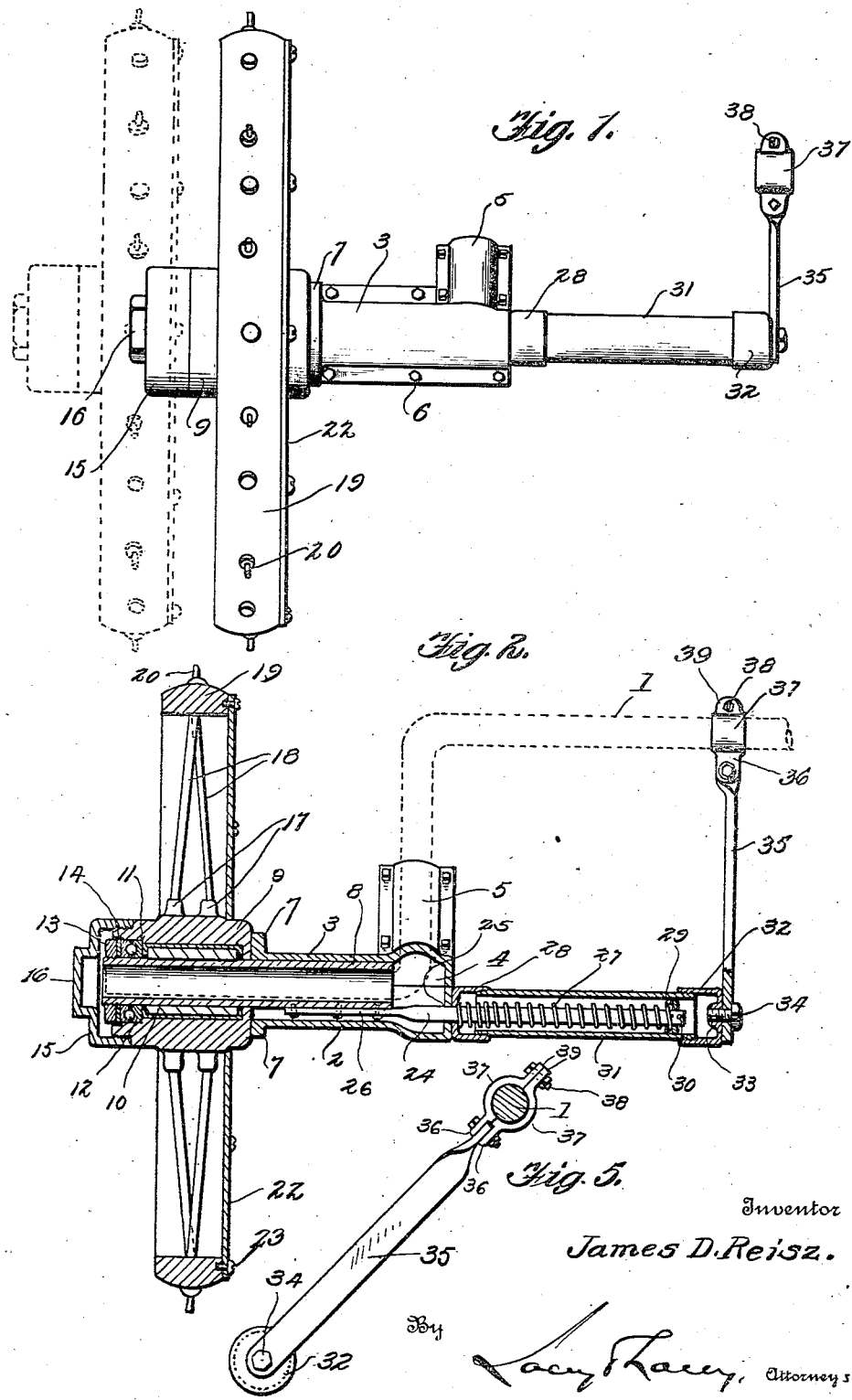
Inventor
James D. Reisz.

Jan. 30, 1923.   1,443,647
J. D. REISZ.
ATTACHMENT FOR TRACTOR PLOWS.
FILED JULY 21, 1921.
2 SHEETS-SHEET 2

Inventor
James D. Reisz.

By Lacey & Lacey, Attorneys

Patented Jan. 30, 1923.

1,443,647

UNITED STATES PATENT OFFICE.

JAMES D. REISZ, OF ROME, KENTUCKY.

ATTACHMENT FOR TRACTOR PLOWS.

Application filed July 21, 1921. Serial No. 486,624.

*To all whom it may concern:*

Be it known that I, JAMES D. REISZ, a citizen of the United States, residing at Rome, in the county of Daviess and State of Kentucky, have invented certain new and useful Improvements in Attachments for Tractor Plows, of which the following is a specification.

This invention relates to tractor drawn plows and has for its object the provision of means whereby the furrow wheel will be caused to follow a previously formed furrow to the end of the same and thereby permit the plow to run to the extreme length of the field so that the ground now generally left unturned in the corners of a field will be plowed and the entire surface of the field rendered available for cultivation. The invention has special reference to the mounting of the furrow wheel and seeks to provide means whereby the wheel will be yieldably held to the side of the furrow during the travel of the plow over the field and the plow thus held to a straight path until after the tractor has exerted sufficient lateral force upon the plow to completely turn the same. The invention is illustrated in the accompanying drawings and will be hereinafter fully set forth.

In the drawings—

Figure 1 is a front elevation of my improved furrow wheel and its mounting;

Fig. 2 is a longitudinal section of the same with a portion of the crank axle of the plow indicated in dotted lines;

Fig. 5 is a detail elevation of the bracing member.

Figure 3:
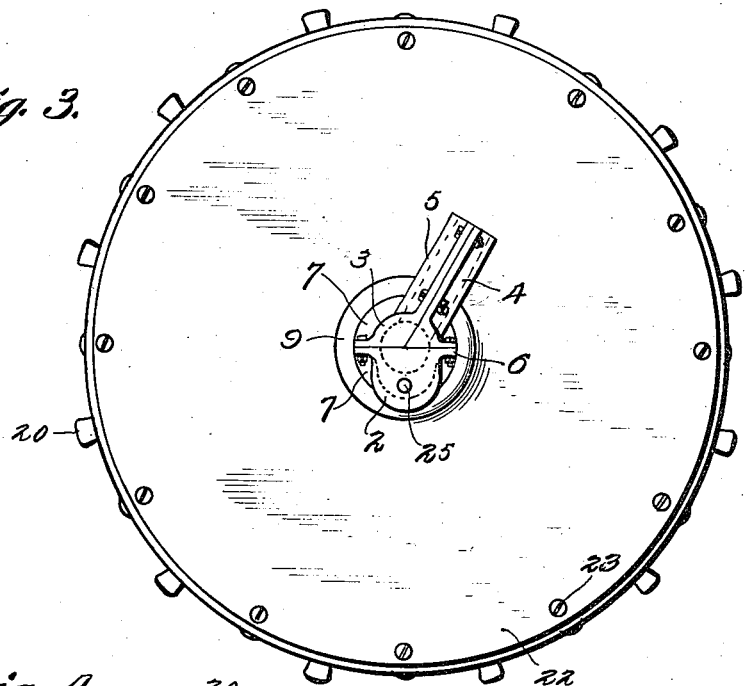
Fig. 3 is an elevation of the inner side of the wheel and its mounting.
Figure 4:
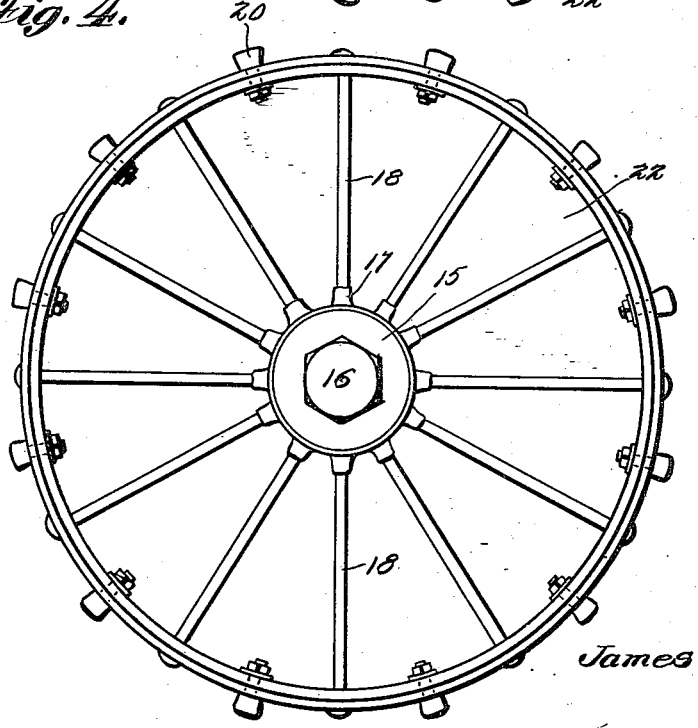
Fig. 4 is an elevation of the outer side of the wheel.

The axle 1 of the plow is of the usual crank axle formation. In applying my invention to the axle, I employ a housing consisting of a lower member 2, an upper member 3, and an intermediate member 4, the upper member 3 being constructed at its inner end with an upwardly and rearwardly inclined half sleeve 5 with which the intermediate member 4 mates to fit around the axle, as shown clearly in Fig. 2, and the upper and intermediate members are both secured upon the lower member 2 by bolts inserted through mating flanges, as indicated at 6, so that a hollow housing results to enclose the wheel-carrying portion of the axle and the sleeve or bushing upon which the wheel is directly mounted. The members 4 and 5 of the housing will, of course, fit snugly around the intermediate portion of the axle so as to securely fasten the housing thereon and at the outer ends of the members 2 and 3 are flanges 7 which constitute a stop collar against which the hub of the wheel may abut. Disposed longitudinally within the members 2 and 3 of the housing and slidable freely therein is a sleeve or bushing 8 which projects through the outer end of the housing and through the hub 9 of the wheel. The hub is provided with a central annular chamber to receive roller bearings 10, and an annular recess 11 in the end of the hub contains end thrust ball bearings 12 which are held therein by a nut 13 threaded upon the outer end of the sleeve or tube 8 and bearing against a washer 14 disposed between the nut and the bearing, as clearly shown in Fig. 2. A dust cap 15 is fitted upon the outer end of the hub and is constructed with a flat-sided projection 16 to be engaged by a wrench or other turning tool. The hub is provided exteriorly with socketed lugs 17 receiving the inner ends of spokes 18, the outer ends of the spokes passing through the rim 19 and being riveted or otherwise firmly secured thereto. Between the ends of adjacent spokes, traction lugs or spikes 20 are secured in the rim of the wheel so as to guard against skidding as effectually as possible. To prevent dirt being thrown between the spokes of the wheel and lodging therein, I secure a cover disc 22 to the inner side of the wheel by screws or similar devices 23 inserted through the said plate adjacent its edge into the rim 19 of the wheel, as will be readily understood.

As shown in Fig. 2, a plunger 24 is provided, the said plunger passing through an opening 25 in the inner end of the housing and having its end portion within the housing flattened and secured rigidly to the under side of the bushing or tube 8, as shown at 26. A spring 27 is coiled around the plunger 24 between a cap 28 thereon and an abutment 29 held on the plunger by a cotter pin or equivalent device 30. The cap 28 abuts the inner end of the housing and is carried by one end of a sleeve 31 which encloses and guards the spring 27 and the inner portion of the plunger 24. Upon the inner end of the sleeve 31, I secure a cap 32, the end of said cap being thickened, as shown at 33, whereby to provide a sufficient bearing for a bolt 34 by which a bracing arm 35 is secured to the said cap. The upper end of the said bracing arm is secured between the forward ends 36 of clamp plates 37 which are properly formed to fit around the main portion of the axle 1 and be firmly secured thereto by a clamping bolt 38 inserted through the upper rear ends 39 of the clamping plates.

The action of the apparatus will, it is thought, be readily understood. The spring 27 is normally expanded so as to hold the hub of the wheel against the outer end or stop collar 7 of the housing. When the tractor reaches the end or side of the field and starts to turn to make a return trip, the wheel will continue forward in the furrow notwithstanding the initial lateral force applied to the plow by the tractor, the spring 27 yielding and being compressed so that the wheel and its hub together with the bushing or tube 8 may move relatively from the position shown in full lines in Fig. 1 to that shown in dotted lines. When the lateral force exerted by the tractor is sufficient to draw the furrow wheel from the furrow and permit the plow to be turned, the spring 27 will at once expand and thereby draw the wheel inwardly until the inner end of the hub 9 abuts the stop collar formed by the flanges 7, as will be readily understood. The diameter of the bushing or tube 8 is sufficiently less than the inner diameter of the housing to permit the bushing to slide freely, but it will be held in a fixed position axially by the plunger and the spring acting thereon and by the sleeve 31 and the bracing arm 35 by which said sleeve is suspended from the plow axle. My device is exceedingly simple in the construction and arrangement of its parts, and may be readily applied to the crank axle of a plow by an unskilled person in a few minutes or removed therefrom when repairs or renewals are necessary. In practice, it will be found highly efficient for the purposes for which it is designed.

Having thus described the invention, what is claimed as new is:

1. In a mechanism for the purpose set forth, the combination of a support, a tube freely slidable axially within said support and projecting through the outer end of the same, a wheel hub fitted upon the outer projecting portion of said sleeve, anti-friction bearings disposed between the hub and said sleeve, end thrust friction bearings fitted in the outer end of the wheel hub, and means for securing said bearings in the hub to hold the hub upon the sleeve.

2. In a mechanism for the purpose set forth, the combination of a housing constructed to be secured upon the cranked axle of a plow, a bushing disposed within said housing and around the carrying portion of said axle, a wheel carried by the outer portion of said bushing and abutting the outer end of the housing, and means acting upon said bushing to yieldably retain the same within the housing.

3. In a mechanism for the purpose set forth, the combination of a housing comprising a lower member, an upper member and an intermediate member, said members being rigidly secured together and the intermediate member and the upper member being provided with mating portions adapted to fit around the intermediate portion of a cranked axle, a bushing slidably fitted within said housing and projecting through the outer side of the same, a wheel carried by the outer portion of said bushing, and means for yieldably holding said bushing within the housing.

4. The combination of a housing adapted to be secured about a cranked axle, a bushing slidably fitted within said housing and projecting through and beyond the outer end of the same, a wheel carried by the outer projecting end of the bushing, a plunger secured to said bushing and playing in the inner end of the housing, and a spring acting upon the plunger to yieldably hold the same and the bushing retracted with the hub of the wheel abutting the outer end of the bushing.

5. The combination of a housing constructed to be secured about a cranked axle, a bushing fitted slidably in said housing, a wheel carried by the outer portion of said bushing and arranged to abut the outer end of the housing, a plunger secured to the inner end of the bushing and projecting through the inner end of the housing, a bracing member adapted to be secured around the cranked axle, a tubular casing secured to and carried by said bracing member at one end and at its opposite end abutting the housing, said tubular casing receiving the inner portion of the plunger, and a spring coiled around the plunger within said tubular casing and having its opposite ends bearing respectively against the outer end of the casing and an abutment upon the plunger.

In testimony whereof I affix my signature.

JAMES D. REISZ. [L. S.]